United States Patent [19]

Ootaki et al.

[11] Patent Number: 5,673,246

[45] Date of Patent: Sep. 30, 1997

[54] OPTICAL PICKUP DEVICE

[75] Inventors: Sakashi Ootaki; Ryo Sato, both of Tsurugashima, Japan

[73] Assignee: Pioneer Electronic Corporation, Tokyo, Japan

[21] Appl. No.: 660,472

[22] Filed: Jun. 7, 1996

[30] Foreign Application Priority Data

Jun. 8, 1995 [JP] Japan ................................ 7-141965

[51] Int. Cl.⁶ ............................................. G11B 7/135
[52] U.S. Cl. ..................... 369/112; 369/44.23; 369/44.32
[58] Field of Search ................................. 369/112, 44.23, 369/44.32; 235/454

[56] References Cited

U.S. PATENT DOCUMENTS 5,164,573  11/1992  Ishikawa ................................. 235/454

Primary Examiner—Georgia Y. Epps
Assistant Examiner—Kim-Kwok Chu
Attorney, Agent, or Firm—Finnegan, Henderson, Farabow, Garrett & Dunner, L.L.P.

[57] ABSTRACT

An optical pickup device which makes a numerical aperture of an object lens in a radial direction of an optical disk smaller than that in a tangential direction to a track on the optical disk. With this feature, a spot diameter in the tangential direction to the track becomes smaller than that in the radial disk in the data recorded surface thereof, and it is possible to prevent degradation of a MTF as well as to accurately read data recorded in the high-density optical disk.

2 Claims, 4 Drawing Sheets

FRONT VIEW

SECTIONAL SIDE VIEW

SECTIONAL PLAN VIEW

OPTICAL PICKUP DEVICE

BACKGROUND OF THE INVENTION

1. Field of the Invention

The present invention relates to an optical pickup device for reading data recorded in an optical disk by irradiating a light beam onto a data recording surface of the optical disk and receiving the light reflected therefrom.

2. Description of the Related Background Art

An optical pickup device for reading data recorded in an optical disk as a bit train along a track is provided in an optical disk playback apparatus such as an optical disk player. The optical pickup device irradiates a light beam onto the data recording surface of the optical disk and receives the light reflected therefrom, obtaining a read signal indicating whether there is any pit at the irradiated point or not in accordance with intensity of the reflected light received thereby. A diameter of a spot of a light beam irradiated onto the recording surface of the optical disk is required to be larger than a pit width in the radial direction of the disk, but is also required to be small so that the reflected light is not affected by pits formed in the adjacent tracks. Accordingly, track intervals become narrow in an optical disk having a high recording density, so that a spot diameter must be made smaller in order to accurately read data from the optical disk having a high density as described above. As a method of making the spot diameter smaller, there has been known a method in which a numerical aperture of an objective lens inside the pickup device is made large.

When the optical disk is inclined and not perpendicular to an optical axis of the objective lens, coma-aberration is resulted. The coma-aberration is proportional to a cube of the numerical aperture. The optical pickup device for reading data from the optical disk having a high density has had the problem that, when the numerical aperture is made larger as described above, a larger coma-aberration caused by the inclination of the optical disk gives adverse effects to reading operation.

SUMMARY OF THE INVENTION

It is an object of the present invention to provide an optical pickup device in which even if a high-density optical disk is inclined, recorded data can accurately be read from the inclined optical disk.

The optical pickup device of the present invention is one which irradiates a light beam onto a data recording surface of the optical disk through an objective lens, receives the light reflected therefrom through the objective lens, and generates a read signal in accordance with intensity of the received light, and a numerical aperture of the objective lens in the radial direction of the optical disk is made smaller than that in a direction of the tangential line to the track on the optical disk.

With the optical pickup device of the present invention, the numerical aperture of the objective lens in the radial direction of the disk is made smaller than that in the direction of the tangential line to the track, so that a diameter of the spot in the radial disk becomes larger than that in the direction of the tangential line to the track in the data recording surface of the optical disk.

DETAILED DESCRIPTION OF THE PREFERRED EMBODIMENT

Detailed description is made hereinafter for an embodiment of the present invention with reference to the related drawings.

Figure 1:
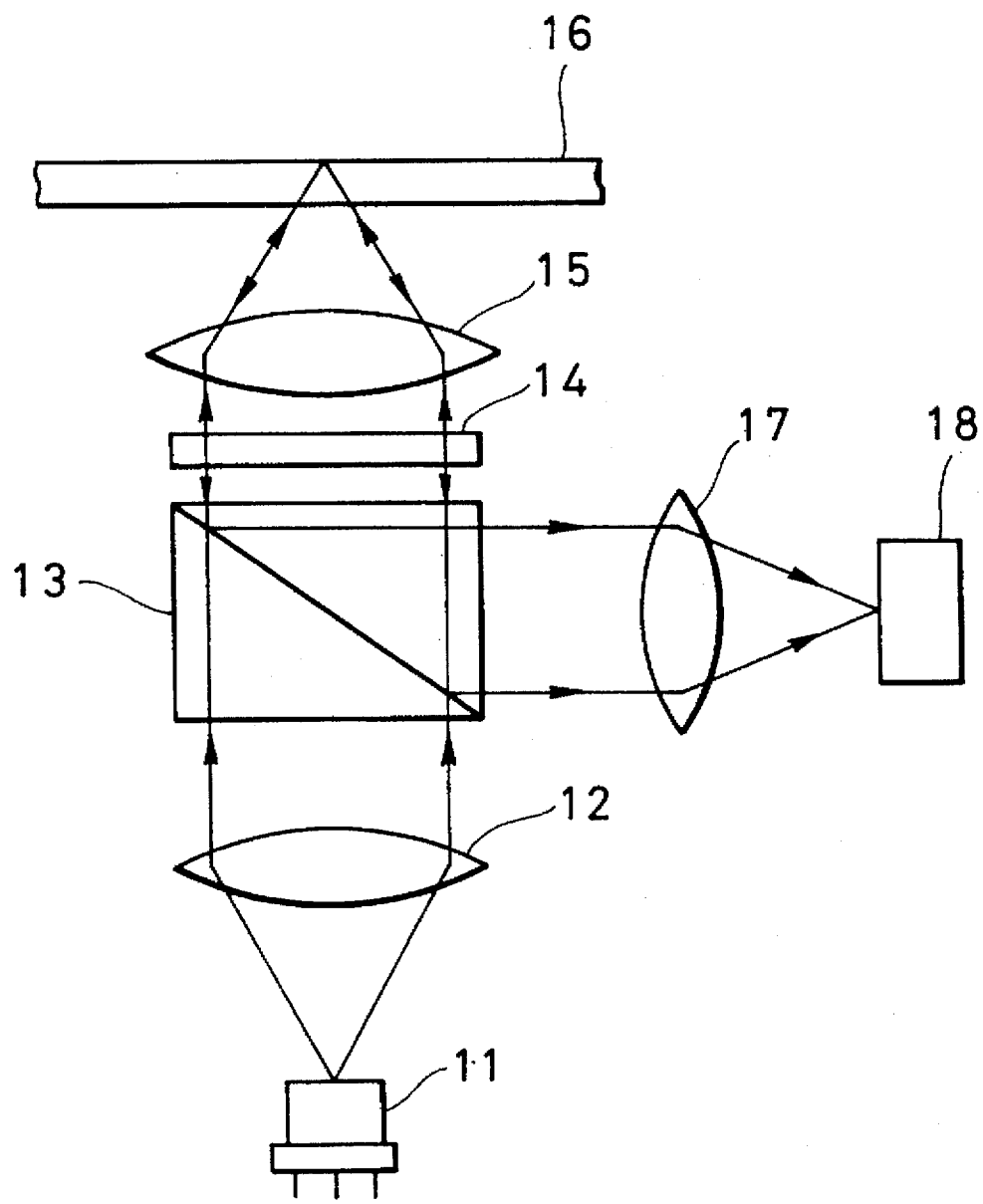
FIG. 1 is a schematic view showing an embodiment of the present invention.

FIG. 1 shows an optical pickup device according to the present invention, and a laser diode 11 is a light source driven by a driving circuit which is not shown in the figure, and for emitting a laser beam thereby. A laser beam emitted from the laser diode 11 is converted to a parallel laser beam by a collimator lens 12, then linearly passes through a beam splitter 13, and further reaches an objective lens 15 through a λ/4 wavelength plate. The objective lens 15 focuses the parallel beam having passed through the λ/4 wavelength plate 14 to a recording surface of an optical disk 16. The light beam reflected on the recording surface of the optical disk 16, namely the reflected light is converted to a parallel laser beam by the objective lens 15, and then reaches the beam splitter 13 through the λ/4 wavelength plate 14. The beam splitter 13 separates the reflected light and supplies the separated light to a condenser lens 17, and the separated light is focused to a light-receptive surface of a photodetector 18 through the condenser lens 17.

Figure 2A:
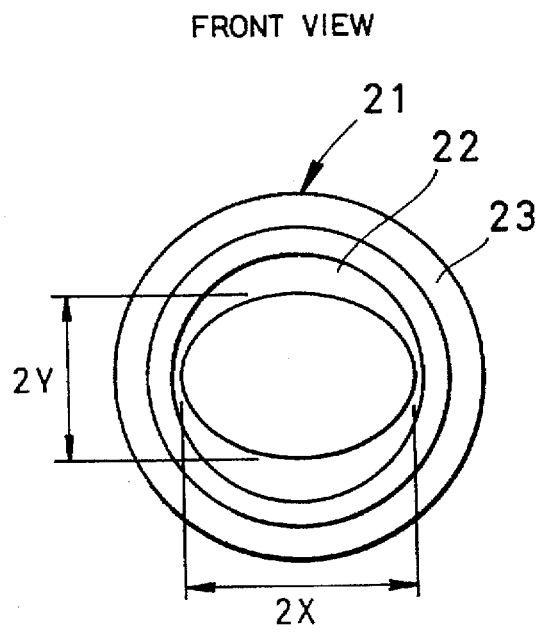
FIGS. 2A to 2C are a front view, a sectional plan view, and a sectional side view each concretely showing a portion of the objective lens in the device respectively.
Figure 2C:
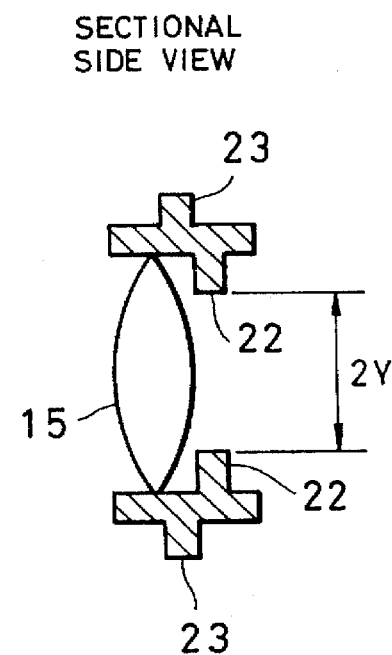
Figure 2B:
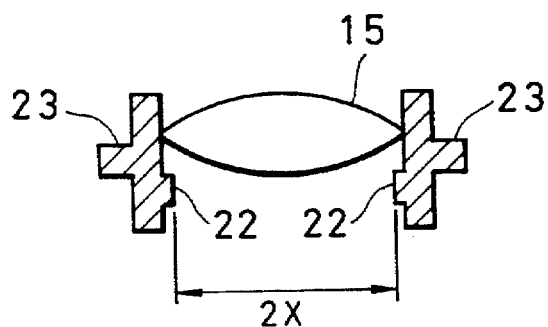

The objective lens 15 is held with a lens holder 21 as concretely shown in FIG. 2A to FIG. 2C. The objective lens 15 itself is a double-convex lens, and a form of its appearance viewed from a direction of the optical axis is a real circle. The lens holder 21 is a hollow cylinder, and holds the objective lens 15 with the inside wall thereof. A diaphragm section 22 circularly projecting from the inside wall of the laser diode 11 side of the position where the objective lens 15 is held, is formed as one body with the lens holder 21. The lens holder 21 including the diaphragm section 22 consists of a transparent body. The diaphragm section 22 forms an oval-shaped opening to the objective lens 15, and operates as an aperture stop. The lens holder 21 is arranged in the optical pickup device so that the major axial direction of the oval is identical to the tangential direction of the track on the optical disk 16, and the minor axial direction thereof is identical with the radial direction of the optical disk 16. A flange 23 projecting from the outside wall of the lens holder 21 is provided inside the device for its attachment. A diameter of the spot on the recording surface of the optical disk 16 is expressed by the following expression:

$$\omega = K \cdot \lambda / NA \qquad (1)$$

Wherein, K indicates a constant, λ indicates a wavelength of a laser beam, and NA indicates a numerical aperture of the objective lens 15. The numerical aperture NA is decided so that an aperture diameter 2D and a focus length f of the objective lens 15 satisfies the following expression (2):

$$NA = D/f \qquad (2)$$

In the present invention, the opening of the objective lens 15 is oval formed with the diaphragm section 22 as described above, so that the diameter in the radial direction of the opening 2D is different from that in the tangential direction thereof, and the opening diameter in the tangential direction is larger than that in the radial direction. Assuming that the opening diameter 2D in the tangential direction is 2X and the opening diameter 2D in the radial direction is 2Y, X is larger than Y (X>Y). It is obtained from the expression (2) that a numerical aperture in the tangential direction NA is equal to X/f, while a numerical aperture in the radial direction NA is equal to Y/f. The numerical aperture in the radial direction is set to be smaller by, for instance, a range from 2 to 10% than that in the tangential direction. Applying each numerical aperture NA described above into the expression (1), and assuming that a diameter of the spot in the tangential direction is $\omega_t$ and that in the radial direction is $\omega_r$, $\omega_t$ and $\omega_r$ are respectively expressed by the following expressions:

$$\omega_t = K \cdot \lambda \cdot f/X \quad (3)$$

$$\omega_r = K \cdot \lambda \cdot f/Y \quad (4)$$

Figure 3:
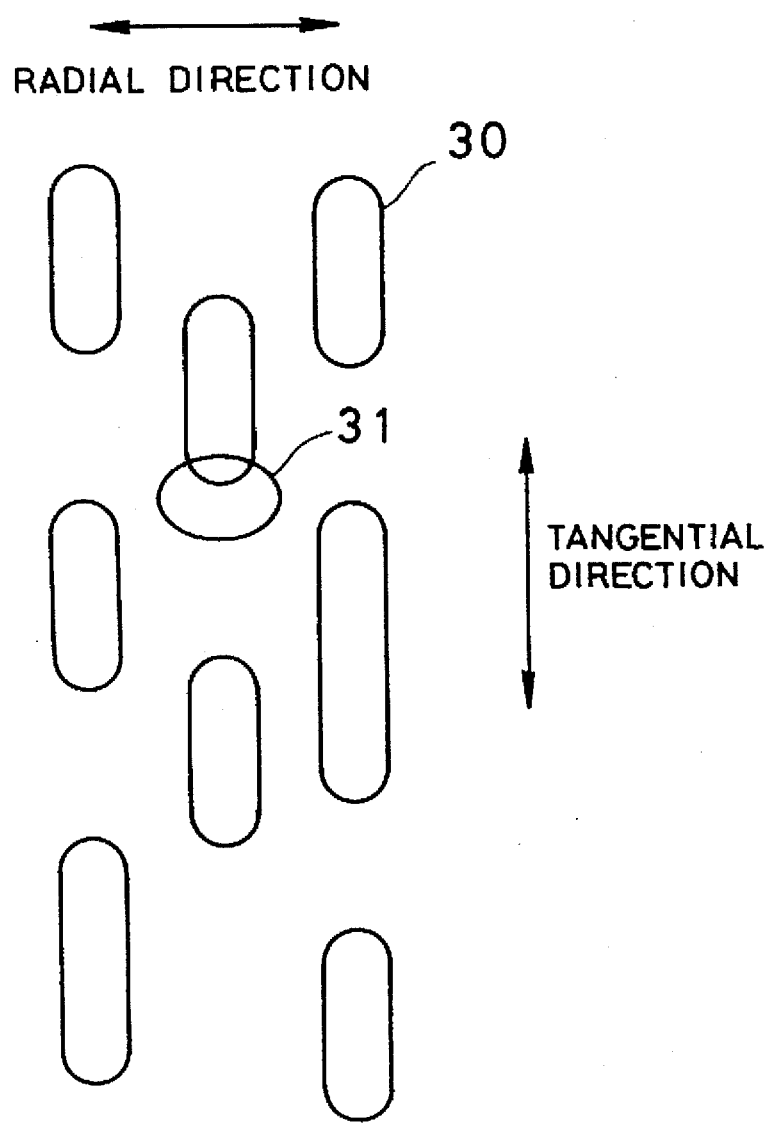
FIG. 3 is a view showing a spot form in a recording surface of an optical disk.

Each of the constant K, wavelength $\lambda$, and focus length f in the expression (3) is identical with each of those in the expression (4), but X is larger than Y, so that $\omega_r$ becomes larger than $\omega_t$. Namely the spot diameter $\omega_r$ in the radial direction becomes larger than that $\omega_t$ in the tangential direction on the data recording surface of the optical disk 16. Accordingly, as shown in FIG. 3, an oval spot light 31 having a radial direction as a major axial direction and a tangential direction as a minor axial direction is irradiated onto the recording surface of the optical disk 16 on which pits 30 are formed.

Figure 4:
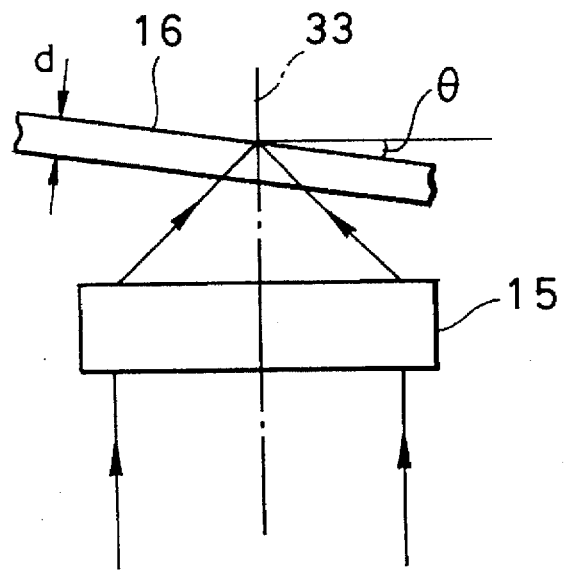
FIG. 4 is a view showing an inclination of the optical disk to the optical axis of a light beam.
Figure 5:
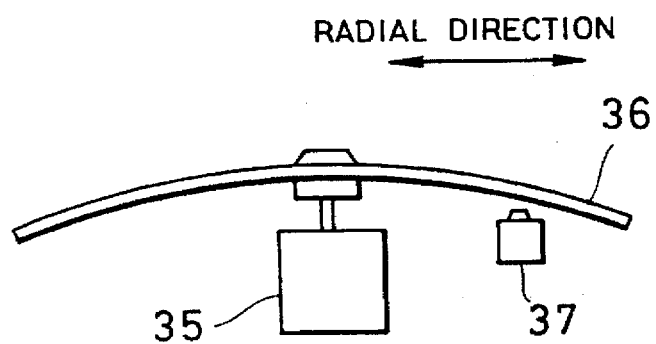
FIG. 5 is a view showing how the optical disk is inclined in an optical disk player.

As shown in FIG. 4, a coma-aberration W occurred in a state in which the optical disk 16 is inclined to an angle of θ with a perpendicular plane to the optical axis 33 of a laser beam irradiated from the objective lens 15 to the optical disk 16 can be expressed as follows:

$$W = -(d/2) \cdot \{(n^2-1)\sin\theta\cos\theta/(n^2-\sin^2\theta)^{5/2}\} \cdot (NA)^3 \quad (5)$$

Wherein, d indicates a thickness of the optical disk 16, and n indicates a refractive index of the optical disk 16. It is understood from the expression (5) that the numerical aperture NA is required to be made smaller to suppress occurrence of the coma-aberration.

On the other hand, in an optical disk player, an inclination of an optical disk 36 rotated and driven by a spindle motor 35 is generally caused by warping or bending in the radial direction. Also, when a recording density of an optical disk is made higher, a pit length per unit becomes smaller, so that it is required that the spot diameter in the tangential direction is made smaller. From these reasons, the numerical aperture in the radial direction NA=Y/f is made smaller than that in the tangential direction NA=X/f in the present invention.

It should be noted that, in the embodiment described above, in order to make a numerical aperture in the radial direction of the optical disk 16 of the objective lens smaller than that in the tangential direction to the track on the optical disk 16, the diaphragm section 22 forming an oval aperture stop is formed as one body with the lens holder, but it is not limited to this form, and the objective lens may be formed in an oval shape. Also, an opaque tape or the like may be attached to the objective lens so that the tape will become an aperture stop.

In the optical pickup device according to the present invention, the numerical aperture of the objective lens in the radial direction of an optical lens is made smaller than that in the tangential direction to the track thereon, so that a diameter of the spot in the tangential direction to the track becomes smaller than that in the radial disk on the data recording surface of the optical disk. Accordingly, it is possible to prevent degradation of an MTF (Modulation Transfer Function) as well as to accurately read data recorded on a high-density optical disk. Also, even if an optical disk is inclined and not perpendicular to an optical axis of a laser beam irradiated to the optical disk, the numerical aperture in the radial disk can be lower, so that it is not required to make coma-aberration larger, the present invention makes it possible to prevent degradation of an S/N ratio in a read signal.

What is claimed is:

1. An optical pickup device for irradiating a light beam to a data recording surface of an optical disk through an objective lens, receiving the light reflected therefrom through said objective lens, and generating a read signal in accordance with intensity of the received light, wherein a numerical aperture of said objective lens in a radial direction of said optical disk is made smaller than that in a tangential direction to a track on said optical disk.

2. An optical pickup device according to claim 1 having a lens holder for holding said objective lens, wherein said lens holder has a diaphragm section forming an oval aperture stop provided in the side of an light source when viewed from said objective lens.

* * * * *